US010194648B2

United States Patent
Hiddema et al.

(10) Patent No.: US 10,194,648 B2
(45) Date of Patent: Feb. 5, 2019

(54) AGRICULTURAL SPRAYER WITH MULTI-SECTION FOLDABLE BOOM

(71) Applicant: AGCO Netherlands B.V., Hesston, KS (US)

(72) Inventors: Joris Jan Hiddema, Grubbenvorst (NG); Harm Martens, Grubbenvorst (NG)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/101,967

(22) PCT Filed: Oct. 23, 2014

(86) PCT No.: PCT/EP2014/072745
§ 371 (c)(1),
(2) Date: Jun. 6, 2016

(87) PCT Pub. No.: WO2015/082121
PCT Pub. Date: Jun. 11, 2015

(65) Prior Publication Data
US 2017/0027152 A1    Feb. 2, 2017

(30) Foreign Application Priority Data

Dec. 5, 2013  (GB) .................................. 1321515.7

(51) Int. Cl.
*A01M 7/00*       (2006.01)
*B05B 1/20*       (2006.01)
(Continued)

(52) U.S. Cl.
CPC ........... *A01M 7/0075* (2013.01); *B05B 1/205* (2013.01); *B05B 9/007* (2013.01); *B05B 13/005* (2013.01); *B05B 15/628* (2018.02)

(58) Field of Classification Search
CPC .. A01M 7/0071; A01M 7/0075; A01M 7/005; A01M 7/0053; A01M 7/0057;
(Continued)

(56) References Cited

U.S. PATENT DOCUMENTS 3,514,038 A  *  5/1970  McQuinn ............ A01M 7/0071
                                                 239/165
3,544,009 A  *  12/1970  Schlueter ............ A01M 7/0075
                                                 239/159

(Continued)

OTHER PUBLICATIONS

European Patent Office, International Search Report for International Patent Application No. PCT/P2014/072745, dated Jan. 28, 2015.

*Primary Examiner* — Alexander Valvis
*Assistant Examiner* — Tuongminh Pham (57) ABSTRACT

An agricultural sprayer including an applicator boom which itself includes a centre boom frame and a pair of multi-section boom side assemblies. Each side assembly is mounted by a respective hinge to the centre boom frame. Neighbouring boom sections are mutually connected by a hinged joint which permits folding around an upright axis from a deployed operating configuration to a transport configuration. A spring and damper mechanism is associated with the hinged joint for controlling pivoting movement around the upright axis between said two boom sections.

15 Claims, 4 Drawing Sheets

(51) Int. Cl.
  B05B 9/00  (2006.01)
  B05B 13/00  (2006.01)
  B05B 15/628  (2018.01)
(58) Field of Classification Search
  CPC ....... B05B 15/628; B05B 1/205; B05B 9/007;
           B05B 13/005; B05B 15/60
  USPC ............... 239/159, 161, 164, 167, 168, 169;
           212/347, 175, 177; 414/694, 22.54,
           414/22.55, 619, 6; 172/4.5
  See application file for complete search history.

(56) References Cited

U.S. PATENT DOCUMENTS

| | | | |
|---|---|---|---|
| 4,044,952 A | 8/1977 | Williams et al. | |
| 4,213,565 A * | 7/1980 | Jackson | A01M 7/0075 239/167 |
| 4,595,140 A * | 6/1986 | Harden | A01M 7/0075 239/167 |
| 4,643,358 A * | 2/1987 | Jackson | A01M 7/0075 172/456 |
| 5,486,084 A * | 1/1996 | Pitman | B60P 1/5433 188/171 |
| 5,957,383 A * | 9/1999 | Benest | A01B 73/04 239/159 |
| 5,988,528 A * | 11/1999 | Krohn | A01M 7/0075 239/168 |
| 7,431,221 B2 * | 10/2008 | Thompson | A01B 73/065 239/166 |
| 7,729,832 B2 * | 6/2010 | Benckert | B66C 13/40 701/49 |
| 2004/0231308 A1 * | 11/2004 | Murphy | A01D 47/00 56/14.9 |
| 2006/0201075 A1 * | 9/2006 | Rivas | A01M 7/0071 52/111 |
| 2006/0255175 A1 * | 11/2006 | Thompson | A01B 73/065 239/168 |
| 2009/0134109 A1 * | 5/2009 | Shimoie | E02F 3/301 212/347 |
| 2009/0173802 A1 | 7/2009 | Theeuwen et al. | |
| 2010/0219264 A1 * | 9/2010 | Meyer | A01M 7/0053 239/164 |
| 2011/0139895 A1 | 6/2011 | Kuphal et al. | |
| 2013/0092753 A1 * | 4/2013 | Barker | A01M 7/0075 239/163 |

* cited by examiner

AGRICULTURAL SPRAYER WITH MULTI-SECTION FOLDABLE BOOM

FIELD OF INVENTION

The invention relates to agricultural sprayers and more particularly to multi-section applicator booms of such sprayers, the booms being foldable from a deployed operating configuration to a transport configuration.

BACKGROUND

Agricultural sprayers are used by farmers and contractors to apply pesticides and other nutrient-containing solutions to crop fields. Sprayers can be mounted to, or towed by, a tractor or other suitable vehicle or may be self-propelled with an integrated means of propulsion and a driver's cab. The sprayer machine typically includes a storage tank for the liquid to be applied, the tank being filled as required by the operator.

The liquid is applied to the field by a number of liquid application devices, typically spray nozzles, which are mounted in a spaced relationship along the length of a boom which, itself, is mounted to the sprayer vehicle. The nozzles are each connected to the storage tank by liquid delivery means comprising various pipes, valves, pumps and other plumbing. The liquid is atomised by the nozzles and applied to the crop in a jet of mist for example.

Applicator booms typically comprise a centre frame which is mounted to a chassis or machine frame at the rear. An adjustable linkage may be employed to permit the boom to be raised and lowered with respect to the ground. Side assemblies are attached to the left- and right-hand sides of the centre frame in a hinged manner so that the boom, in an operating configuration, extends transversely with respect to the forward direction of travel and, in a transport configuration fold with respect to the centre frame so as to extend longitudinally forward alongside the tank.

Each side assembly typically comprises more than one boom section, wherein adjacent sections are connected by a hinged joint which permit the sections to be folded 180 degrees around an upright hinge axis when in the transport configuration.

Respective hydraulic cylinders connected between adjacent mutually-hinged sections serve to control the folding and deployment thereof.

The length of the overall boom determines the operating width of the sprayer. Driven by economies of scale, there is a growing demand for sprayer manufacturers to produce machines with longer spray booms. However, increasing the boom length significantly increases the risk of structural failure due to the increased stress placed upon the hinges and joints caused by natural vibrations and oscillations which pass from the spray vehicle along the boom. Moreover, the amplified oscillations along the boom, left uncontrolled, can lead to uneven application of pesticides.

The centre frame is, on larger machines especially, suspended relative to the chassis to permit pitch, roll and yaw movement of the boom and reduce bending stresses in the boom caused by movement of the machine especially over uneven ground. Spring and damper mechanisms provided on the centre frame serve to control these movements.

Despite such efforts to reduce the stresses caused by boom oscillations, boom lengths are, today, approaching their physical limits with any further increase in length proving extremely challenging to manufacturers. Significant strengthening of the joints, mountings and hinges between sections and along the boom adds cost both in terms of weight and bill of materials.

SUMMARY OF INVENTION

It is an object of the invention, therefore, to overcome the aforementioned challenges.

It is another object of the invention to reduce bending stresses along an applicator boom caused by pitch and yaw movements.

In accordance with the invention there is provided an agricultural sprayer comprising an applicator boom itself comprising a centre boom frame and a pair of side assemblies each hingeably mounted to the centre boom frame and comprising two boom sections mutually connected by a hinged joint which permits folding around an upright axis from a deployed operating configuration to a transport configuration, wherein a spring and damper mechanism is provided at the hinged joint for controlling pivoting movement around the upright axis between said two boom sections.

The invention involves the recognition that bending stresses exerted along the boom sections can be reduced by permitting the boom to flex at the hinged joints in a controlled manner. By introducing a degree of freedom for the hinged joint to move during operation, together with a spring and damper mechanism, a portion of the bending stresses are transferred to, and absorbed by, the hinged joint. Advantageously, this increases the design freedom to use lighter materials and/or increase the boom length.

The centre boom frame is typically mounted at the rear of the sprayer and may be suspended from a chassis or frame of the sprayer to permit roll, pitch and/or yaw movement of the overall boom. Separate spring and damper mechanisms may be provided to control these movements of the centre frame relative to the chassis.

The invention reduces the stresses placed upon the centre frame caused by pitch and yaw movement of the boom. Advantageously, the risk of structural failure, especially where the side assemblies hinge to the centre frame, is reduced. Also, the reduced forces exerted on the centre frame spring/damper mechanics allows for lighter, and thus cheaper, components to be employed.

The centre frame may support a plurality of spray nozzles spread out across the width thereof.

The side assemblies may comprise two or more sections which are connected by hinges and fold with respect to one another. Each section within a side assembly may be similar in construction, More preferably however, the outer boom sections are lighter in construction than those disposed inwardly thereof.

Preferably the hinged joint has associated therewith a linear actuator arranged to control said folding movement between said two boom sections. The linear actuator is preferably a hydraulic cylinder but may instead, for example, comprise an electric actuator.

The linear actuator is preferably connected at a first end to a first of said two boom sections with a degree of freedom which permits the actuator to move in a direction substantially aligned with the longitudinal axis of the actuator. Advantageously, the mounting of the actuator in this way offers a degree of freedom which permits the actuator to move, and thus the hinged joint to flex, during operation.

To explain further, accelerations of the boom extremities in the fore and aft direction create a bending force at the hinged joints. By giving the actuators (provided for the folding functionality) freedom to move in a direction substantially aligned with their longitudinal axis, the adjacent boom sections can fold to a limited extent around the upright axis defined by the associated hinge.

In a preferred embodiment the linear actuator is connected at a first end to a first of said two boom sections by a first lever. The first lever is preferably pivotally attached to the first boom section for pivoting movement around a substantially vertical or upright axis, namely the fulcrum. The actuator is pivotally connected to the first lever at a pivot joint spaced from the fulcrum.

The spring and damper mechanism preferably acts upon the first lever and may comprise spring means arranged to apply a restoring force to the first lever when the first lever pivots away from a neutral position.

The spring means preferably comprises a pair of rubber springs located on respective opposite sides of the first lever. Rubber springs are relatively inexpensive and are simple to mount to the boom section. When compressed by movement of the first lever, the rubber springs (alternatively termed stops or cushions) simply exert a restoring force as required. Alternatively, coil springs fitted in tension or compression may be used.

The spring and damper mechanism preferably comprises a damper connected to the first lever at a joint spaced from a fulcrum of the first lever. The damper is preferably a hydraulic damper. By connecting a damper to the first lever, the damping characteristics can be simply selected during design by appropriate positioning of the damper from the fulcrum. Moreover, "off-the-shelf" dampers can be employed to save on production costs, wherein the connection to the lever can be adapted to cater for the predetermined damper characteristics.

The lever may be provided with a plurality of holes to allow common dampers to be used during manufacture of different boom configurations, thereby improving modularity.

The linear actuator may be connected at a second end to a second lever that is pivotally connected to the first boom section, wherein the second lever is coupled to a second of said two boom sections by a linkage. Advantageously, the actuator can be mounted at both ends to the first boom section making simple assembly and disassembly. The second lever and linkage may serve as a crank connected to the second boom section to accommodate the near-180 degree folding action.

The spring and damper mechanism preferably comprises compression spring means (for example rubber stops) located between respective juxtaposed ends of said two boom sections when in the operating configuration. The rubber stops or cushions serve to counteract over-centre flexing around the hinge axis.

The two boom sections may each comprise a frame defining a frame profile, wherein the spring and damper mechanism resides within the frame profile at least when in the operating position. The frame preferably comprises hollow structural section (HSS) within which the spring and damper mechanism resides. Advantageously, the HSS serves to protect the components of the spring and damper mechanism from the weather and atomised corrosive chemicals emanating from the boom during operation.

The invention is applicable to many different configurations of boom side assemblies each having different numbers and lengths of boom sections. In a simple embodiment, a side assembly may have an inner section and an outer section with a hinged joint in accordance with the invention joining the two sections. In a more complex arrangement an agricultural sprayer may have a pair of side assemblies, wherein each side assembly comprises three boom sections and two hinged joints each having a respective associated spring and damper mechanism.

BRIEF DESCRIPTION OF DRAWINGS

Further advantages of the invention will become apparent from reading the following description of a specific embodiment with reference to the appended drawings in which.

DETAILED DESCRIPTION OF SPECIFIC EMBODIMENT

Figure 1:
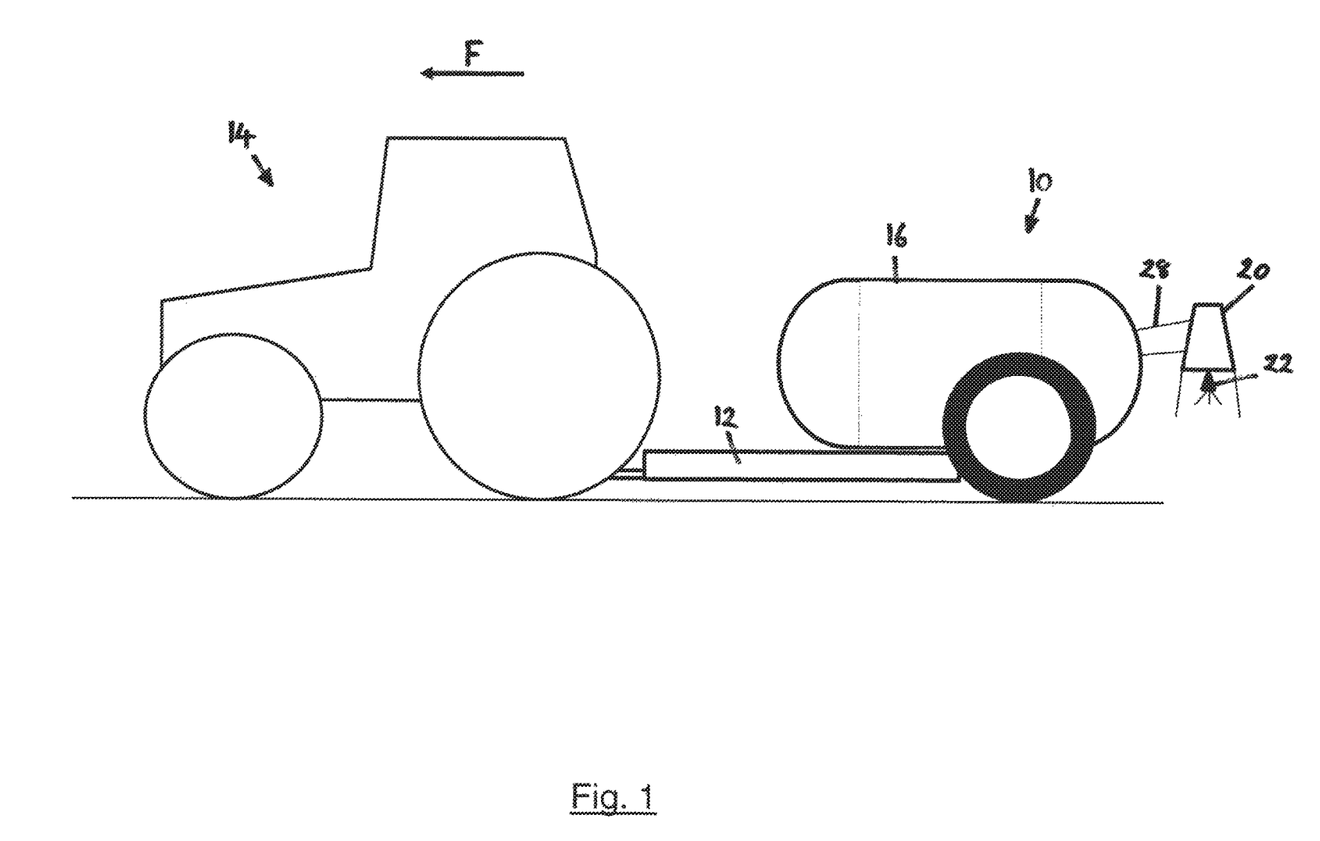
FIG. 1 is a schematic side view of a tractor pulling an agricultural sprayer showing the boom in a deployed operating configuration.
Figures 2, 4:
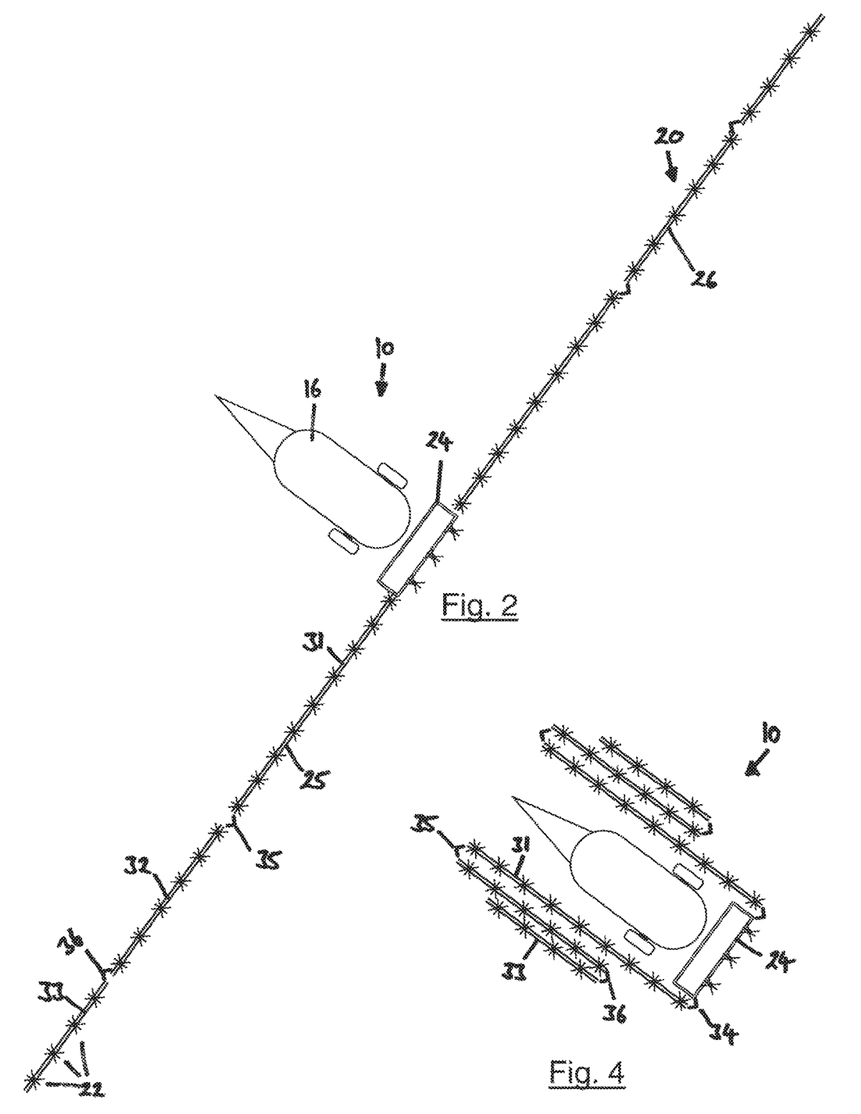
FIG. 2 is a schematic plan view of the sprayer of FIG. 1.
FIG. 4 is a schematic plan view of the sprayer of FIG. 1 but showing the boom in a folded transport configuration.
Figure 3:
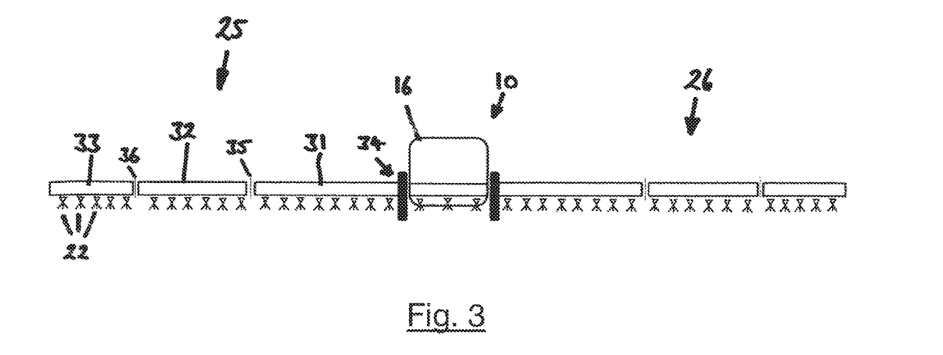
FIG. 3 is a schematic rear view of the sprayer of FIG. 1.

With reference to FIGS. 1 to 3, a pull-type agricultural sprayer 10 comprises a wheeled chassis 12 for attachment to a tractor 14 (FIG. 1 only) which tows the sprayer 10 in a generally forward direction indicated by arrow F. The sprayer 10 comprises a tank 16 for storing a pesticide solution and a transversely extending applicator boom 20. The tank is plumbed to a plurality of nozzles 22 by a network of pipes and valves which are omitted from the drawings for clarity.

The following description will make use of directional terms which are used in relation to the forward direction of travel F. The term "longitudinal" will typically refer to a direction parallel to the forward direction of travel, whereas the term "transverse" will mean a horizontal direction perpendicular to the forward direction of travel.

Although described in relation to the illustrated pull-type sprayer 10, it should be understood that the invention is applicable to all agricultural sprayers having a transversely-extending multi-section applicator boom including, by way of example, sprayers mounted to the linkage of tractors and to self-propelled sprayers.

The applicator boom 20 comprises a centre frame 24, a left-hand side assembly 25 and a right-hand side assembly 26. The centre frame 24 is mounted to the rear of sprayer 10 by a variable height linkage 28 represented schematically in FIG. 1. Linkage 28 permits the working height of the boom 20 to be changed to suit the operating conditions. Mounting a boom in this way is well known and will not be described any further.

Although not illustrated the centre frame 24 may be suspended with respect to the chassis 12 so as to allow the centre frame 24 (and the side assemblies 25,26) to move in a multitudes of axes, typically to allow pitch, roll and yaw movement. The suspension mechanism typically includes a ball joint which allows a degree of freedom in multiple directions.

The construction of the left-hand side assembly 25 will be described hereinafter. However, it should be appreciated that the right-hand side assembly 26 is substantially identical in albeit in a mirrored form.

Side assembly 25 comprises three boom sections, an inner section 31, an intermediate section 32, and an outer section (or wing) 33. Inner boom section 31 is hinged at one end to the centre frame 24 by hinge 34, and at the other end to the intermediate section 32 by hinge 35. Intermediate boom section 32 is hinged at the outer end to outer boom section 33 by hinge 36. It will be understood that innermost hinge 34 supports the full weight of the side assembly 25 whereas the outer hinges 35, 36 support only a portion of the weight.

Alternatively, outer hinge 36 may be replaced with a simple breakaway joint which does not fold in the transport position.

The nozzles 22 are mounted along the boom 20 in a spaced relationship and serve to atomise the liquid solution to be applied and direct the mist or spray onto the crop or ground below.

Each hinged joint 34,35,36 defines an upright, or substantially vertical, folding axis which allows the boom sections 31,32,33 to fold with respect to one another around 180 degrees from a deployed operating configuration (FIG. 2) to a folded transport configuration (FIG. 4). Also, each hinged joint 34,35,36 has associated therewith a respective hydraulic cylinder for controlling the folding movement. Therefore, application of appropriate hydraulic signals from a control system activates the hydraulic cylinders so as to fold and unfold the boom sections as required. These hydraulic cylinders will be described in more detail below.

The invention is related to the hinged joints 35,36 between neighbouring boom sections. Inner hinged joint 35 will be described hereinafter but it should be understood that the described construction may apply instead, or additionally, to the outer hinged joint 36.

Figure 5:
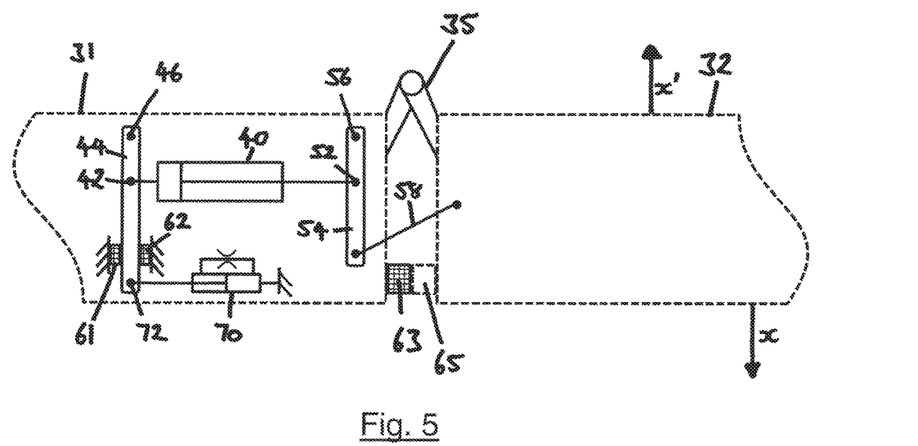
FIG. 5 is a schematic plan view of a hinged joint of the boom having a spring and damper mechanism in accordance with the invention, shown in a deployed operating position.

With reference to FIG. 5, inner boom section 31 is connected to intermediate boom section 32 by a hinge mechanism 35 which has a pivot axis offset rearwardly of the boom sections' trailing edge. This offset provides adequate spacing between the sections 31,32 when folded alongside one another.

Figure 6:
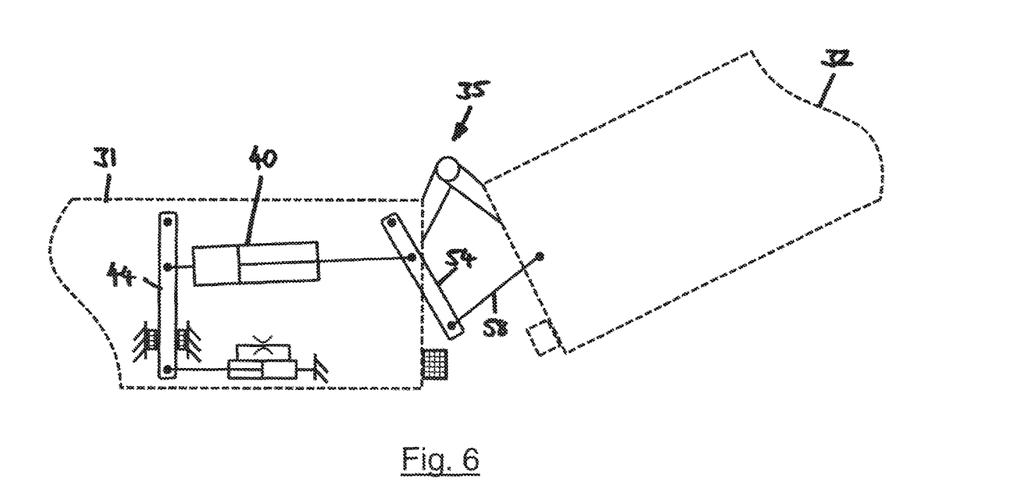
FIG. 6 is a plan view of the joint of FIG. 5 shown in a partially folded position; and, FIG. 7 is a plan view of the joint of FIG. 5 shown in a folded transport position.
Figure 7:
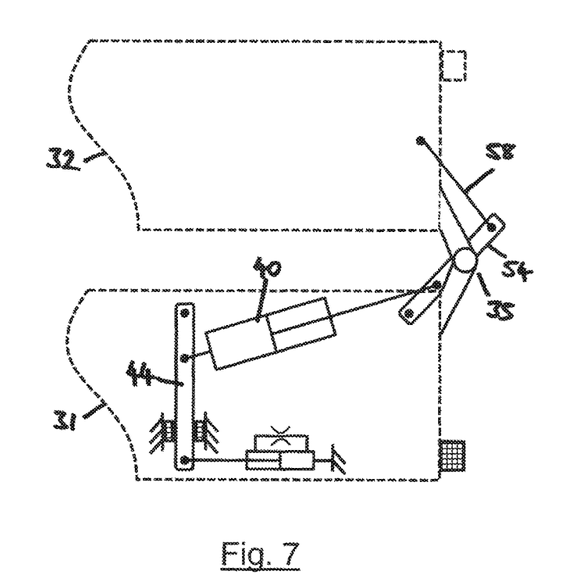

Each boom section 31,32 has a frame formed from a length of hollow structural section (HSS) which may be extruded. FIG. 1 shows an example trapezium-section profile but square or rectangular section, for example, may be used instead. The folding mechanism and spring/damper system to be described below is preferably housed within the HSS so that the components are protected from the elements. FIGS. 5 to 7 show the HSS profile with dashed lines to emphasise that the spring/damper system is hidden within.

It should be understood that the folding mechanism and spring/damper system illustrated in FIGS. 5 to 7 is shown in schematic form but the skilled person would readily apply the principal embodied into existing boom structures.

Hydraulic cylinder 40 is pivotally connected at a first end at 42 to a first lever 44 which itself is pivotally connected at its fulcrum 46 to the inner boom section 31. At a second end, remote the first end, hydraulic cylinder 40 is pivotally connected at 52 to a second lever 54 which itself is pivotally connected at its fulcrum 56 to the inner boom section 31 proximate to the end of the boom section 31 nearest the hinged joint 35.

First and second levers 44,54 each pivot about respective fulcrums 46,56 each having a substantially vertical pivot axes attached to the HSS. The levers 44,54 permit the hydraulic cylinder 40 a limited freedom of movement in a direction substantially parallel to the cylinder's axis. This axial movement of the cylinder 40 is restricted by the spring and damper mechanism which will be described in more detail below.

A link arm 58 connects the second lever 54 to the intermediate boom section 32. It should be understood that second lever 54 and link arm 58 are represented in a highly schematic form and the functionality provided thereby may be provided for in a variety of ways. For example, the second lever 54 and link arm 58 may be provided by an integrated crank which can accommodate the 180 degree folding movement.

FIG. 5 shows the hinged joint 35 in a deployed or operating configuration corresponding to that shown FIG. 2. By extending the hydraulic cylinder 40 from the position shown in FIG. 5, the intermediate boom section 32 is folded with respect to the inner boom section 31 as illustrated in FIG. 6 (partly folded) and FIG. 7 (completely folded). Hinged joint 35 is also shown in a folded (or transport) configuration in FIG. 4.

It can be seen from FIGS. 5 to 7 that second lever 54 and link arm 58 convey the folding force from the hydraulic cylinder 40 whilst first lever 44 remains predominantly static. First lever 44 serves primarily to provide the freedom of movement for the hydraulic cylinder 40 and is subject to spring and damper forces as described below.

First and second rubber springs (or stop or cushion) 61,62 are mounted to the left and right sides respectively of first lever 44 and fixed with respect to the inner boom section 31. A third rubber spring 63 is mounted externally to the end of inner boom section 31 adjacent the end of intermediate boom section 32. In the operating position shown in FIG. 5, a rigid stop 65 provided on the intermediate boom section 32 acts abuts third rubber spring 63.

In the operating position the intermediate boom section 32 can flex or deflect away from the elongate axis of the boom with limited folding movement around the axis of hinged joint 35. It should be understood that the hydraulic cylinder 40 typically remains at a constant length during such flexing.

A forward deflection of intermediate boom is indicated by arrow x and is counteracted by first and third springs 61,63. In this case first spring 61 provides a restoring force against first lever 44 whereas third spring 63 acts directly upon rigid stop 65.

A deflection of the intermediate boom section 32 in the rearward direction is indicated by arrow x' and is counteracted by second spring 62 which acts upon the first lever 44.

A hydraulic damper 70 is connected between the frame of the inner boom section 31 and a pivoting connection 72 on first lever 44. The damper serves to damp the oscillations created by fore and aft forces on the intermediate boom section 32.

The spring and damper system is conveniently located on one of the boom sections providing simplicity in assembly and disassembly.

During the folding sequence illustrated in FIGS. 6 and 7, it should be appreciated that the springs 61,62 restrict movement of first lever 44 and, thus, hydraulic cylinder 40.

Although provided by a pivoting lever in the embodiment shown, the hydraulic cylinder may be mounted in different ways whilst still keeping a degree of freedom to permit flexing of the hinged joint and remaining within the scope of the invention.

Each hinged joint has been described as having substantially vertical pivot axes. However, the term "upright" is intended to cover inclined pivot axes that contribute to raising or lowering the boom section ends remote the hinge when folded. In these cases, the pivot axes do not typically exceed 20 degrees from vertical.

Although the above-described embodiment includes a hydraulic cylinder and spring/damper mechanism attached to the inner boom section 31, its is envisaged that the cylinder and mechanism could instead be mounted to the intermediate boom section 32 without deviating from the scope of the invention.

In summary there is provided an agricultural sprayer comprising an applicator boom itself comprising a centre boom frame and a pair of multi-section boom side assemblies. Each side assembly is mounted by a respective hinge to the centre boom frame. Neighbouring boom sections are mutually connected by a hinged joint which permits folding around an upright axis from a deployed operating configuration to a transport configuration. A spring and damper mechanism is associated with the hinged joint for controlling pivoting movement around the upright axis between said two boom sections.

The invention claimed is:

1. An agricultural sprayer comprising an applicator boom itself comprising a centre boom frame and a pair of side assemblies each hingeably mounted to the centre boom frame and comprising an inner boom section and an intermediate boom section mutually connected by a first hinged joint which permits a folding movement around an upright axis from a deployed operating configuration to a transport configuration, and an outer boom section connected to the intermediate boom section by a second hinged joint, wherein a spring and damper mechanism is provided at the first hinged joint for controlling pivoting movement around the upright axis between the inner boom section and the intermediate boom section, wherein the first hinged joint has associated therewith a linear actuator arranged to control said folding movement between the inner boom section and the intermediate boom section, wherein the linear actuator is connected at a first end to a first one of the inner boom section and the intermediate boom section by a first lever wherein the spring and damper mechanism acts upon the first lever, wherein the spring and damper mechanism comprises a spring mechanism arranged to apply a restoring force to the first lever when the first lever pivots away from a neutral position, wherein the spring mechanism comprises a pair of rubber springs located on respective opposite sides of the first lever.

2. The agricultural sprayer according to claim 1, wherein the spring and damper mechanism comprises a hydraulic damper connected to the first lever at a joint spaced from a fulcrum of the first lever.

3. An agricultural sprayer comprising an applicator boom itself comprising a centre boom frame and a pair of side assemblies each hingeably mounted to the centre boom frame and comprising an inner boom section and an intermediate boom section mutually connected by a first hinged joint which permits a folding movement around an upright axis from a deployed operating configuration to a transport configuration, and an outer boom section connected to the intermediate boom section by a second hinged joint, wherein the first hinged joint has associated therewith a linear actuator arranged to control said folding movement between the inner boom section and the intermediate boom section, wherein the linear actuator is connected at a first end to a first one of the inner boom section and the intermediate boom section by a first lever, wherein the linear actuator is connected at a second end to a second lever that is pivotally connected to the first one of the inner boom section and the intermediate boom section, wherein the second lever is coupled to a second one of the inner boom section and the intermediate boom section by a linkage, wherein a spring and damper mechanism is provided at the first hinged joint for controlling pivoting movement around the upright axis between the inner boom section and the intermediate boom section, wherein the spring and damper mechanism acts upon the first lever.

4. The agricultural sprayer according to claim 3, wherein the spring and damper mechanism comprises a spring mechanism arranged to apply a restoring force to the first lever when the first lever pivots away from a neutral position.

5. The agricultural sprayer according to claim 3, wherein the spring and damper mechanism comprises a compression spring device located between respective juxtaposed ends of the inner boom section and the intermediate boom section when in the operating configuration.

6. The agricultural sprayer according to claim 5, wherein the compression spring device comprises a rubber spring fixed to the end of one of the inner boom section and the intermediate boom section.

7. The agricultural sprayer according claim 3, wherein the inner boom section and the intermediate boom section each comprise a frame defining a frame profile, and wherein the spring and damper mechanism resides within the frame profile at least when in the operating position.

8. The agricultural sprayer according to claim 7, wherein the frame comprises a hollow structural section within which the spring and damper mechanism resides.

9. The agricultural sprayer according to claim 3, wherein the second hinged joint comprises a respective associated spring and damper mechanism.

10. The agricultural sprayer according to claim 3, wherein the spring and damper mechanism comprises a spring mechanism arranged to apply a restoring force to the first lever when the first lever pivots away from a neutral position.

11. The agricultural sprayer according to claim 3, wherein the spring mechanism comprises a pair of rubber springs located on respective opposite sides of the first lever.

12. The agricultural sprayer according to claim 3, wherein the spring and damper mechanism comprises a hydraulic damper connected to the first lever at a joint spaced from a fulcrum of the first lever.

13. The agricultural sprayer according to claim 3, wherein the first and second levers permit the linear actuator to move in an axial direction parallel to an axis of the linear actuator, wherein a spring and damper mechanism acts upon the first lever to restrict axial movement of the linear actuator.

14. The agricultural sprayer according to claim 2, wherein the first levers permits the linear actuator to move in an axial direction parallel to an axis of the linear actuator, wherein a spring and damper mechanism acts upon the first lever to restrict axial movement of the linear actuator.

15. An agricultural sprayer comprising an applicator boom itself comprising a centre boom frame and at least one side assembly mounted to the centre boom frame, the at least one side assembly comprising a boom section connected by a hinged joint which permits a folding movement of the boom section about an upright axis from a deployed operating configuration to a transport configuration, wherein the hinged joint has associated therewith a linear actuator arranged to control said folding movement of the boom section, wherein the linear actuator is connected at a first end to said boom section by a first lever, the first lever being pivotally connected at a fulcrum to the boom section, and the linear actuator is connected at a second end to said boom section by a second lever, the second lever being pivotally connected at a fulcrum to the boom section, wherein the first and second levers permit the linear actuator to move in an axial direction parallel to an axis of the linear actuator, wherein a spring and damper mechanism acts upon the first lever to restrict axial movement of the linear actuator.

* * * * *